(12) United States Patent
Warrick

(10) Patent No.: US 10,869,436 B2
(45) Date of Patent: Dec. 22, 2020

(54) HYDROPONIC GROWING SYSTEM

(71) Applicant: Harold Warrick, Wilson, NY (US)

(72) Inventor: Harold Warrick, Wilson, NY (US)

( * ) Notice: Subject to any disclaimer, the term of this patent is extended or adjusted under 35 U.S.C. 154(b) by 230 days.

(21) Appl. No.: 16/179,260

(22) Filed: Nov. 2, 2018

(65) Prior Publication Data

US 2019/0223395 A1 Jul. 25, 2019

Related U.S. Application Data

(60) Provisional application No. 62/621,995, filed on Jan. 25, 2018.

(51) Int. Cl.
| | | |
|---|---|---|
| *A01K 31/06* | (2006.01) | |
| *A01G 31/06* | (2006.01) | |
| *C02F 1/00* | (2006.01) | |
| *A01G 9/02* | (2018.01) | |
| *C02F 1/74* | (2006.01) | |
| *A01G 31/02* | (2006.01) | |
| *A01G 31/00* | (2018.01) | |

(52) U.S. Cl.
CPC ............. *A01G 31/06* (2013.01); *A01G 9/027* (2013.01); *A01G 31/02* (2013.01); *C02F 1/001* (2013.01); *C02F 1/74* (2013.01); *A01G 2031/006* (2013.01)

(58) Field of Classification Search
CPC ........ A01K 31/06; A01K 31/02; A01K 31/00; A01K 2031/006
See application file for complete search history.

(56) References Cited

U.S. PATENT DOCUMENTS

| | | | |
|---|---|---|---|
| 3,550,319 A | 12/1970 | Gaines, Jr. | |
| 4,057,930 A | 11/1977 | Barham | |
| 5,056,260 A | 9/1991 | Sutton | |
| 6,000,173 A | 12/1999 | Schow | |
| 8,726,568 B2 * | 5/2014 | Wilson .................. | A01G 31/02 47/62 R |
| 8,904,705 B2 * | 12/2014 | Downs, Sr. ............ | A01G 31/02 47/62 A |
| 9,277,696 B2 * | 3/2016 | Wilson .................. | A01G 31/02 |
| 10,070,600 B2 * | 9/2018 | Orff ....................... | A01G 31/02 |
| 2009/0126269 A1 * | 5/2009 | Wilson .................. | A01G 31/00 47/62 R |

(Continued)

FOREIGN PATENT DOCUMENTS

CA 2919917 A1 * 8/2016 ............. A01G 31/02

*Primary Examiner* — Kristen C Hayes
(74) *Attorney, Agent, or Firm* — Vincent G. LoTempio

(57) ABSTRACT

A hydroponic growing system having multiple growing units, wherein each growing unit includes a container for a plant. The growing units are linked through a water recirculation system. The water recirculation system includes a sprayer located on an upper, inner portion of the growing unit above a water level. Water is sprayed downward onto the water surface and plants creating increased levels of oxygen for optimal growth. Each growing unit is connected to a water return channel that directs water to a water pump to circulate water throughout the system via a pressurized manifold system. Sprayers are connected to the manifold for introducing water into the growing unit. The system delivers limitless oxygen to roots and can produce healthy plants with fewer nutrients than conventional systems. The system provides increased oxygen levels such that plant life can thrive, even in less than optimal conditions.

18 Claims, 20 Drawing Sheets

(56) References Cited

U.S. PATENT DOCUMENTS

| | | | |
|---|---|---|---|
| 2015/0296725 A1* | 10/2015 | Mong | A01G 31/02 47/62 A |
| 2018/0343812 A1* | 12/2018 | Leo | A01G 7/045 |
| 2018/0368346 A1* | 12/2018 | Watson | A01G 29/00 |

* cited by examiner

HYDROPONIC GROWING SYSTEM

CROSS-REFERENCE TO RELATED APPLICATIONS

This application claims the benefit of provisional application No. 62/621,995 filed on Jan. 25, 2018.

BACKGROUND

The present disclosure relates generally to hydroponic growing systems. The present disclosure is designed with a new water oxygenation process that does not use or require air stones or air pumps to oxygenate the water. The present disclosure utilizes a water recirculation process that provides constant aeration of the water which maintains the oxygen levels at a consistent saturation rate to sustain plant life. The present disclosure provides limitless oxygen, requires fewer nutrients, can be cleaned while in use without any disruption to plant life, and results in healthier plants and larger yields.

DESCRIPTION OF RELATED ART

Hydroponics is the cultivation of plants in liquid nutrients without soil. Soil captures and stores nitrogen, potassium, and other mineral nutrients which the plant roots absorb gradually. Hydroponics, in contrast, engulfs the plant roots in a liquid nutrient solution. By definition, hydroponics is the method of growing plants without soil that utilizes mineral nutrient solutions in a water solvent. Some plants may be grown with only their roots exposed to the mineral solution or the plant roots may be supported by an inert hydroponic medium.

Hydroponics and hydroponic growing, first recognized in the 1600's, has expanded tremendously to today, where hydroponic growing systems are used more frequently, and specifically in an indoor environment. A significant mechanical design feature of a hydroponic growing system is the ability for the system to oxygenate water consistently and without a prolonged period of disruption.

Air stones, unfortunately known to clog growing systems, are currently the most popular method used to oxygenate the water in a hydroponic growing system. An air stone failure results in a depletion of oxygen, can lead to water stagnation, root rot, and ultimately the death of the plant. A root mass clog, a common problem and probable reason for air stone failure, can form around the air stone decreasing water oxygen saturation significantly. The main concern is that the plants may not show signs of oxygen depletion from a root mass clog until it is too late and the plant will most likely perish despite any intervention.

Hydroponic growing system designs are limited, vary widely by design, and inconsistent results often occur due to drawbacks with the mechanical design of the hydroponic growing system. This can result in a complete loss of the plant life living within the hydroponic growing system. Probable and known problems with hydroponic growing systems include air stone and air pump failures, nutrient deficiencies, nutrient overload, temperature fluctuations, root rot, root mass clogs and water stagnation.

A popular choice in the hydroponic growing systems that are currently purchased and used, utilize an under current method, referred to as a deep-water culture design. Under current systems utilize a system of interconnected, individual growing buckets, a main reservoir, and air stones. This type of system utilizes negative pressure to pump water and nutrients through the system into the bottom of each bucket relying on the air stone to oxygenate the water. A primary reason for a plant to perish is a root mass clog enveloping the air stone leading to oxygen deprivation. However, this type of system is also susceptible to nutrient deficiencies, nutrient overload, temperature fluctuations, root rot, and water stagnation. Further it is difficult to change the water in the system, a requirement in hydroponic growing, without some concern and even harm to the plants growing in the system.

Another popular variation of a hydroponic growing system is referred to as NFT or nutrient film technique. Best described as a continuous-flow solution environment where the nutrient solution constantly flows past the roots in a constant stream. The water contains all the dissolved nutrients which are re-circulated past the bare roots of plants. The plants, grown in channels, form a thick root mat in the bottom of the channel while the upper portion of the plant is exposed to the air. In this design an abundant supply of oxygen is provided to the roots of the plants. However, there are few significant downfalls to an NFT design. The hydroponic growing system has to be frequently monitored, temperature is hard to control often leading to total plant loss, and this design is restrictive allowing for only certain types of plants that can be grown within this type of system.

Ebb and flow designs are another commonly used type of hydroponic growing system. The water and nutrients are stored in a main reservoir, are then pumped into a control reservoir, which feeds the water and nutrient mixture to several plant containers. The plant containers are filled to a predetermined level which is maintained by a timer in the main controller for a preset amount of time. Once the fill cycle timer has finished, a drain pump turns on, pumps the water and nutrient mixture back into the main reservoir, draining all of the plant containers. Any failures with the electrical aspects of this system, such as the controllers or pumps failures, or power outages can result in serious problems. However, a more significant design problem is a lack of sufficient fresh water and nutrient exchange due to root mass clogs that compromise the fill/drain line at the bottom of the plant containers preventing the appropriate flow of the water and nutrient mixture resulting in a reduction in air flow inhibiting water oxygenation.

Other less commonly used hydroponic growing systems have similar and serious problems as the more commonly used hydroponic growing systems mentioned above. Many of the concerns surrounding the limitations and inadequate design of hydroponic growing systems are due to the fact that any type of failure can result in the entire loss of plants in a harvest cycle.

SUMMARY

The present disclosure addresses the aforementioned limitations in the field of hydroponic growing systems. The present disclosure's design resolves mechanical issues that contribute to the reasons for failures that have been previously discussed. The present disclosure can achieve consistent levels of dissolved oxygen that has only tenuously been produced with air stones. Dissolved oxygen refers to the level of free, non-compound oxygen present in water or other liquids. Dissolved oxygen is an essential component in evaluating water quality due to its influence on the organisms living within a body of water.

Water flow directly affects the amount of oxygen dissolved in the water. Higher volumes of faster moving water increase the turbulent diffusion of oxygen into the water and rapidly moving water tends to contain more dissolved oxygen. The present disclosure produces faster moving water and the turbulent diffusion of oxygen through the use of sprayers, a water injection manifold, and a water recirculation return system, which in its entirety, emulates a waterfall environment that increases the dissolved oxygen levels within the system. In one embodiment, the present disclosure re-circulates all of the water within the hydroponic growing system approximately every five minutes delivering water to each growing unit simultaneously while maintaining consistent and optimal levels of dissolved oxygen that can produce healthy plants with fewer nutrients. In one embodiment, approximately every five minutes, each growing unit empties and is replenished by the water injection manifold with freshly oxygenated nutrient filled water which improves growth.

BRIEF DESCRIPTION OF DRAWINGS

The advantages and features of the present disclosure will be better understood with use of the attached photographs and the below detailed description, wherein.

DETAILED DESCRIPTION OF THE PRESENT DISCLOSURE

In the following detailed description, reference is made to the accompanying drawings labeled as and referred to as figures that show specific parts of the present disclosure that have been numbered and can be referred to throughout several or more figures. In referring to the figures, the description of the present disclosure is indicated in sequence of figures, with the overall present disclosure referred to in the following description as a hydroponic growing system 10 as shown in FIG. 1.

Figure 1:
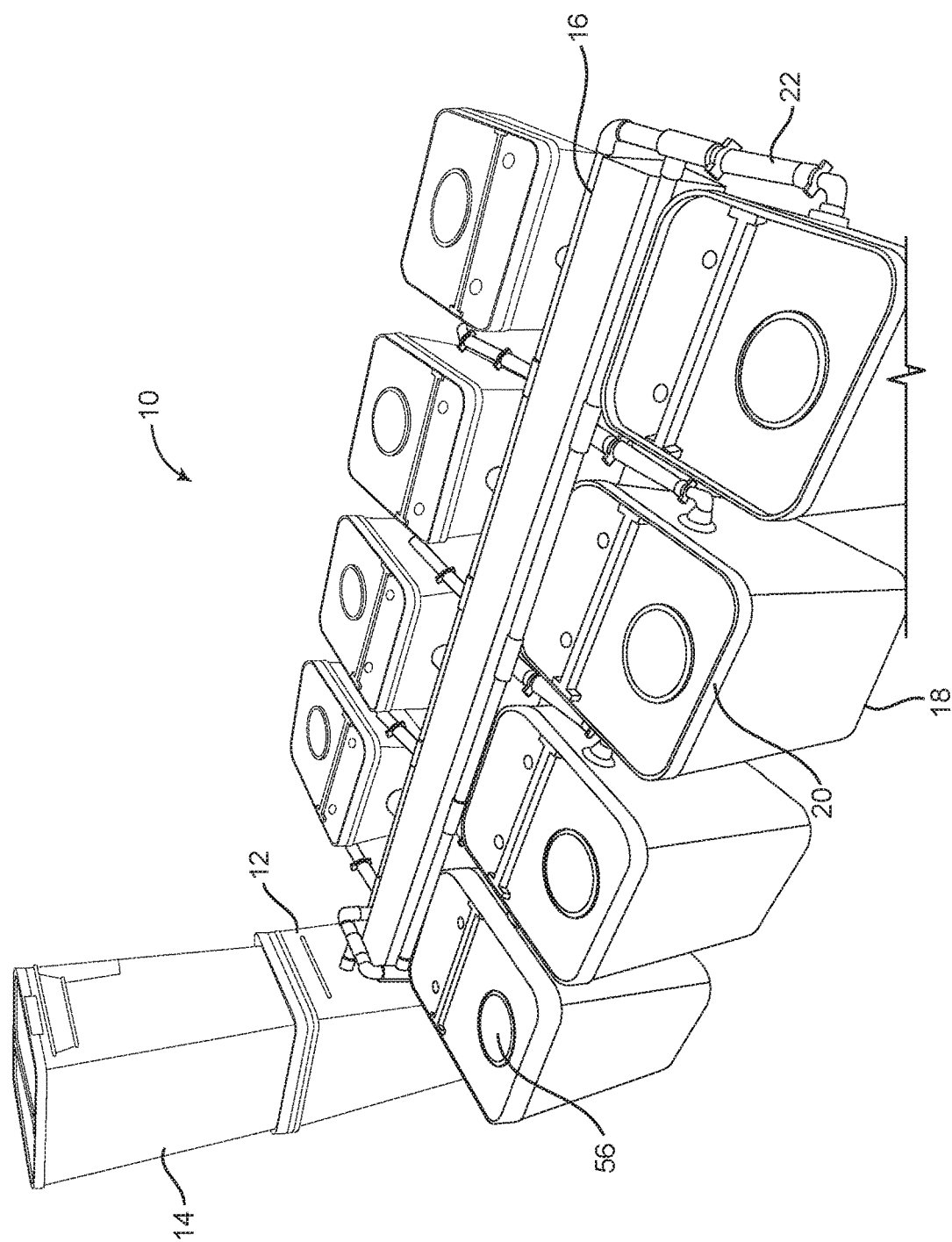
FIG. 1 is a side perspective view of the system of the present disclosure.

FIG. 1 shows hydroponic growing system 10. This hydroponic growing system utilizes a water recirculation process that provides constant aeration of the water that maintains the oxygen levels at a consistent saturation rate to sustain plant life. FIG. 1 shows a key system component, the waterfall recirculation return module 12, which utilizes a multi-tiered recirculation process, which produces a process comparable to a waterfall, within hydroponic growing system 10. The hydroponic growing system 10 overviewed in FIG. 1 is comprised of the waterfall recirculation return module 12, multiple growing units 18 with attached lids 20, a water injection manifold 22, that is connected to the water return channel 16. FIG. 1 shows that located on top of the waterfall recirculation return module 12 is the waterfall recirculation return module refill reservoir 14 that assists in providing consistent water levels throughout the entire hydroponic growing system 10; a significant requirement for the plant life growing in any hydroponic system.

A key component, water injection manifold 22 (shown in FIG. 3), is the water delivery mechanism that starts as waterfall recirculation return module 12 pumps water through the water injection manifold entry component 26 into the water injection manifold 22 into the growing units 18 through sprayers 20, which are located at the top of growing units 18, and results in equal, consistent, and rapid water distribution to growing units 18 for plant life that would be grown in net pots 56. In this design, all of growing units 18 are all simultaneously part of the water recirculation process creating system wide oxygen availability to the plant life.

Figure 2:
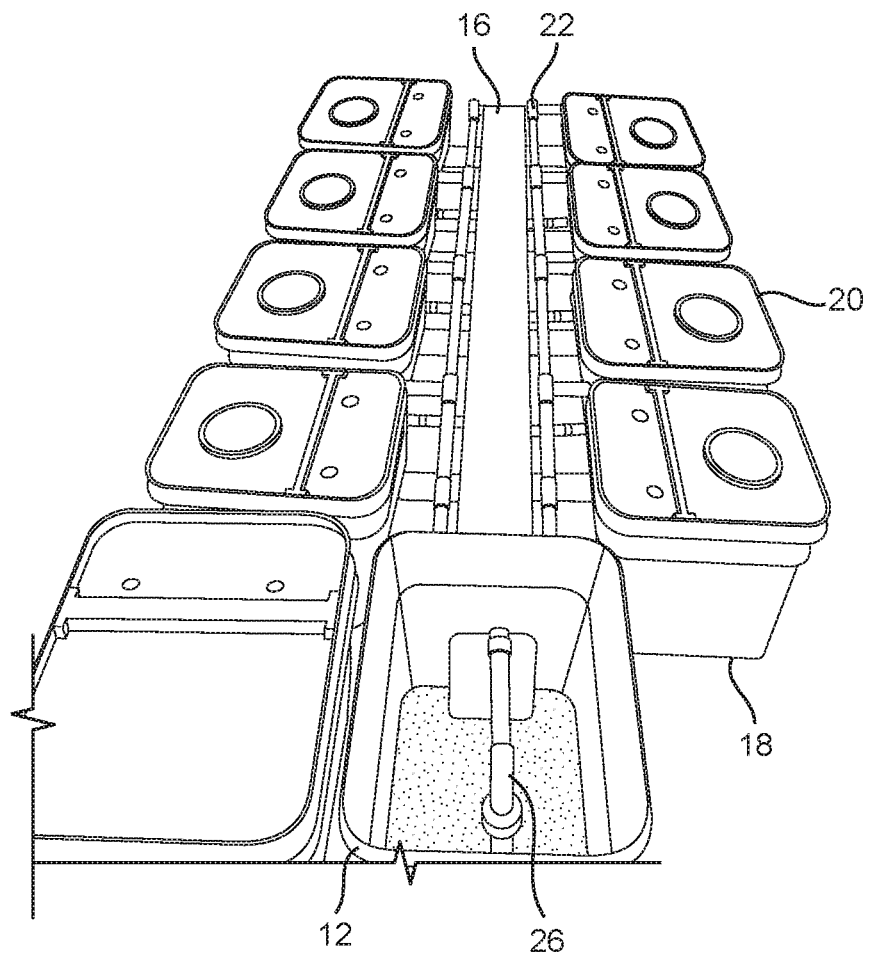
FIG. 2 is a top perspective view of the system of the present disclosure.

FIG. 2 shows the entire view of hydroponic growing system 10 with waterfall recirculation return module refill reservoir 14 removed in addition to the lid of the waterfall recirculation return module 12. The interior of the waterfall recirculation return module 12 is shown. In the interior of waterfall recirculation return module 12 is the water injection manifold entry component 26. The water injection manifold entry component 26 exits the waterfall recirculation return module 12 through a ¾" bulkhead fitting 30 and now is referred to as water injection manifold 22. The water injection manifold 22 distributes the water to growing units 18. The easy access to the interior of waterfall recirculation return module 12 provides ease in monitoring water temperature, water volume, oxygen and PH levels, and simplicity when adding nutrients. The design also allows for easy adaptability to automation.

Figure 3:
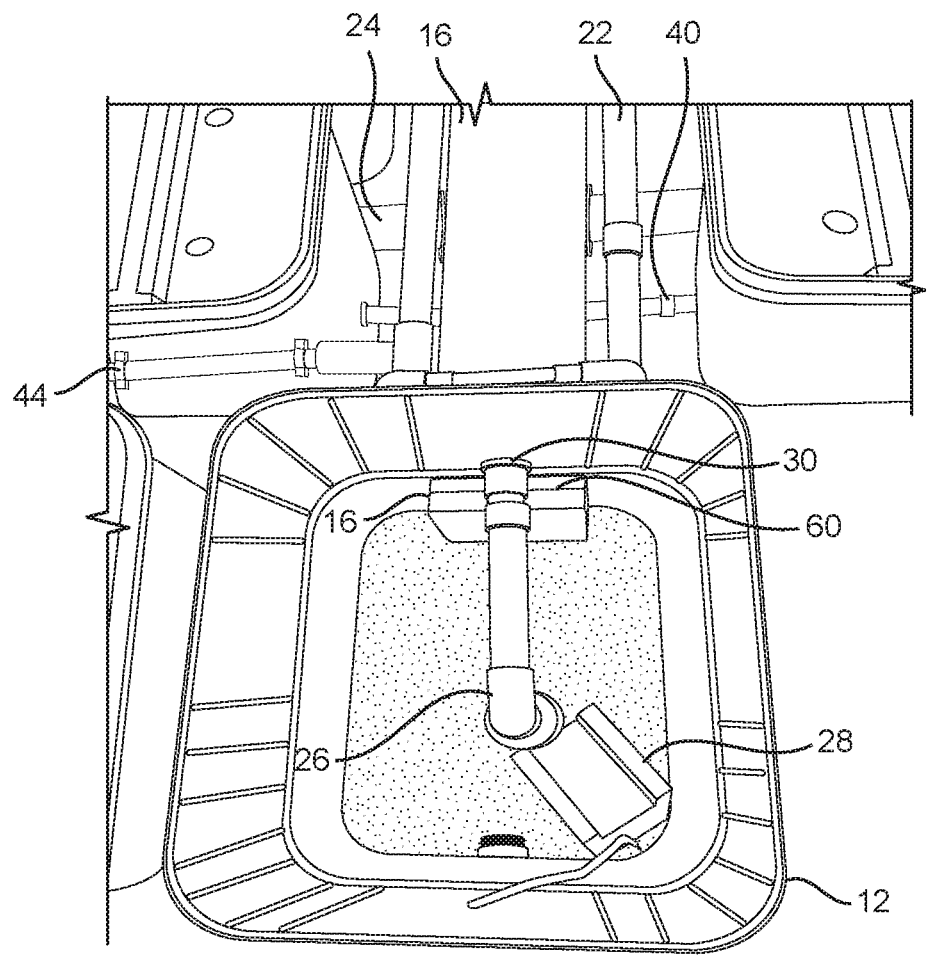
FIG. 3 is cross sectional view of the present disclosure's waterfall recirculation return module and its exterior connections.

FIG. 3 shows a closer view of the interior and exterior of waterfall recirculation return module 12. FIG. 3 shows the waterfall recirculation return module 12 interior and exterior components specifically the connections to the water return channel 16. Shown is water injection manifold entry component 26 and the ¾" bulkhead fitting 30 to water injection manifold 22, a growing unit 18 with lid 20, water return channel unit connection 24, a 1200 GPH water pump 28, drainage system 40, and growing system exterior sprayer head arm assembly 44 that connects from water injection manifold 22 to growing unit 18.

Figure 19:
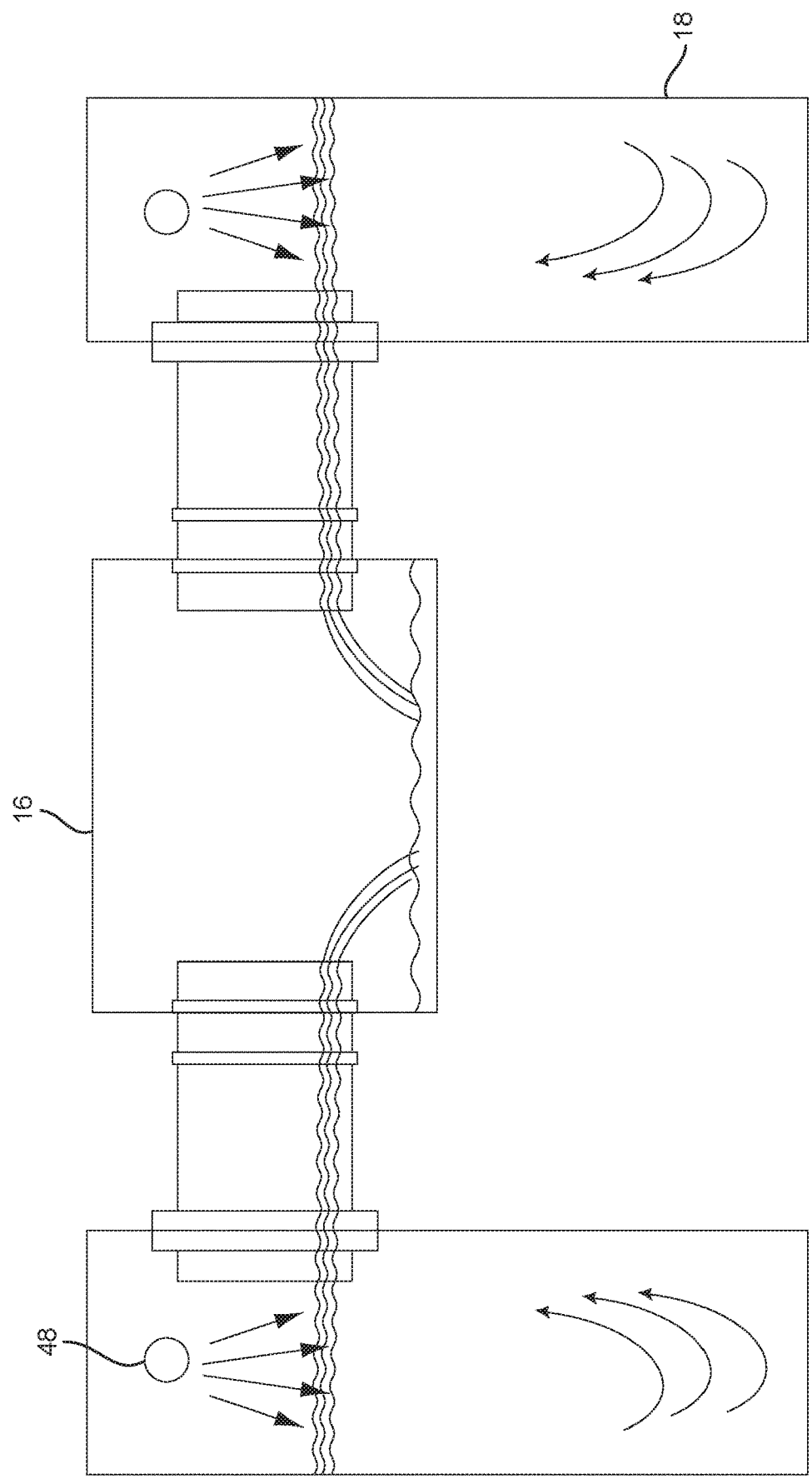
FIG. 19 is a cross sectional front view of growing units and the water return channel of the present disclosure.

In one embodiment of the present disclosure, hydroponic growing system 10 has a 1200 gallon per hour pump rate that is pumping 60 gallons of water through-out hydroponic growing system 10. The water injection manifold 22 and water injection manifold entry component 26, the source of water delivery to each growing unit, designed in a closed loop, measures in total at approximately 14' ½" feet. The size of water pump 28 pumping a small amount of water in a short, closed loop makes hydroponic growing system 10 fast flowing in itself even before sprayers 48 into each growing unit 18 are factored in. Importantly, the role of water pump 28 in any water pumping system, is to provide sufficient pressure to exceed the operating pressure of hydroponic growing system 10. Another variable influencing the water's velocity is water injection manifold 22. This design delivers water to each growing unit 18 simultaneously. As shown in FIG. 19, the injection of water from sprayer 48 into each growing unit 18 and the flow of water out of the growing unit 18 through the water return channel 16 occur simultaneously. Constant motion and recirculation of the water maintains the water's oxygenation.

In hydroponic growing system 10 of the present disclosure, the water oxygenation level may be measured in parts per million (ppm). PPM may be measured with a YSI 55 (dissolved oxygen meter). The YSI 55 water quality meter measures dissolved oxygen in mg/L or % saturation and also has manual salinity compensation of 0 to 40 ppt. The YSI 55 has a dissolved oxygen measurement range of 0 to 20 mg/L or 0 to 200%, resolution of 0.01 mg/L or 0.1% and accuracy of ±0.3 mg/L or ±2% saturation respectively. The YSI 55 has a temperature measurement range from −5 to 45° C., with 0.1° C. resolution and ±0.2° C. accuracy". 14 ppm is considered poor oxygenation as it reflects over saturation, while 1 ppm reflects stagnation. 9 ppm may be considered an optimal level for sustaining growth. In an embodiment of the present disclosure, hydroponic growing system 10, when measured from any growing unit 18 in the system, may consistently measure between 8.0 and 8.5 ppm, thereby creating a favorable growing environment. The range of oxygenation may vary and growth would be affected accordingly, as would be known to one of ordinary skill in the art. In one embodiment, each growing unit 18 may be approximately one square foot of water surface area. The water surface area, where water and air meet, has a high concentration of oxygen. Water's flow from the sprayer 48, enhanced by modified sprayer head 41 breaks the water's surface tension in each growing unit 18, thereby causing fast-flowing water, which directly affects the amount of atmospheric oxygen dissolved into the water. Higher volumes of faster moving water, or "white water", which the sprayers 48 create in this system, increases the diffusion of atmospheric oxygen into the water increasing dissolved oxygen levels, and in combination with the rest of the hydroponic growing system 10 design, delivers the necessary PSI (pounds per square inch) of water pressure into each growing unit 18 that results in favorable growing conditions.

In one embodiment, hydroponic growing system 10 holds 60 gallons of water and water pump 28 pumps 1200 gallons of water per hour. Therefore, within hydroponic growing system 10 water is pumped at 20 gallons a minute. Due to the fact that hydroponic growing system 10 re-circulates 60 gallons of water and hydroponic growing system 10 is pressurized by the water injection manifold 22 at all times, the hydroponic growing system 10 will consistently contain and maintain the same amount of water in the pool of water in each growing unit 18. With respect to the amount, in gallons of water, 60 gallons, divided by eight growing units 18 is approximately 7.5 gallons of water per growing unit 18. However, when the water pump 28 is on, factoring in water in water return channel 16, water injection manifold 22, and water recirculation return module 12, as hydroponic growing system 10 is running in a fast paced closed loop, each growing unit 18 may have approximately 15 gallons of water sprayed into growing unit 18 per minute.

Figure 4:
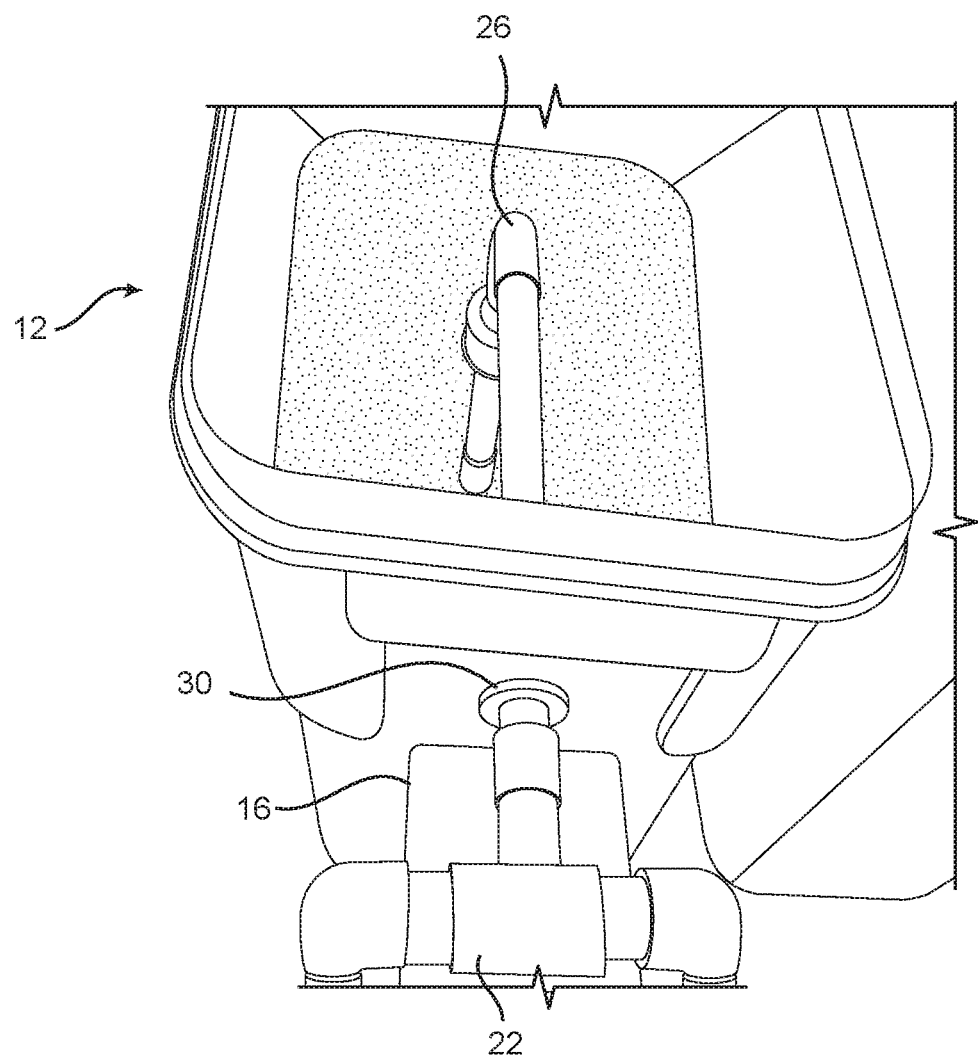
FIG. 4 is a top view of the present disclosure's waterfall recirculation return module's exterior connections.

FIG. 4 is a view of the waterfall recirculation return module 12. The water return channel 16 and water injection manifold 22 enter into waterfall recirculation return module 12 through water tight connections. The water injection manifold 22 enters the waterfall recirculation return module 12 through a sealed ¾" bulkhead fitting 30. The water injection manifold 22 within the interior of the waterfall recirculation return module 12 is now referred to as the water injection manifold entry component 26.

Figure 5:
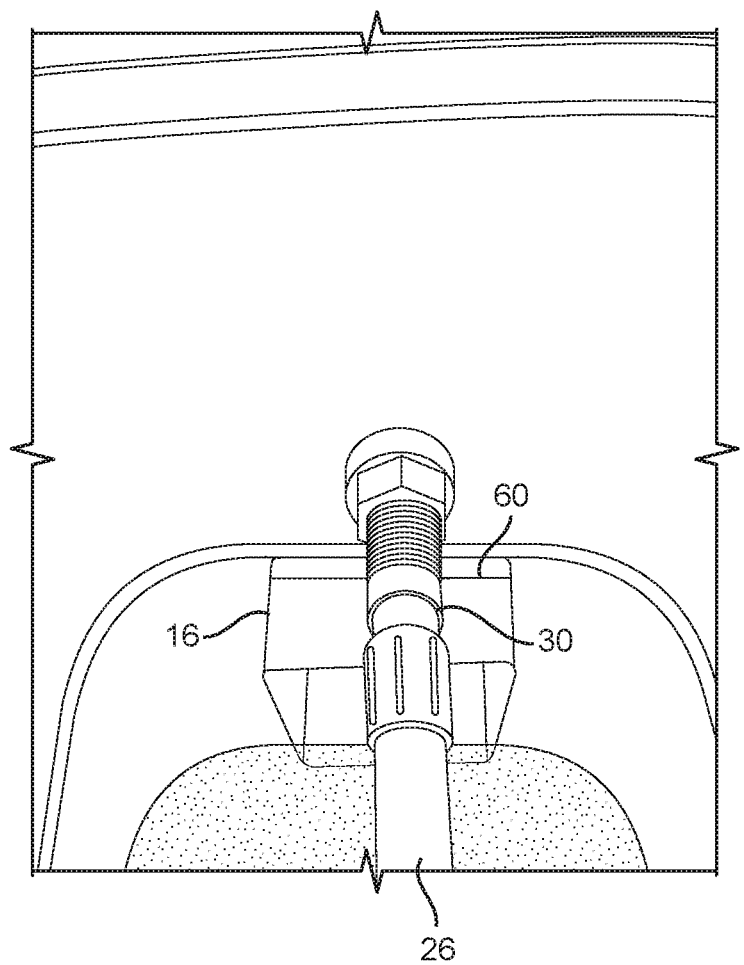
FIG. 5 is a top perspective view of present disclosure's waterfall recirculation return module's interior connection to the water return channel.

FIG. 5 shows a closer interior view of the water return channel 16, the water injection manifold 22, and sealed ¾" bulkhead fitting 30 within the waterfall recirculation return module 12. FIG. 5 shows grommet 60.

Figure 6:
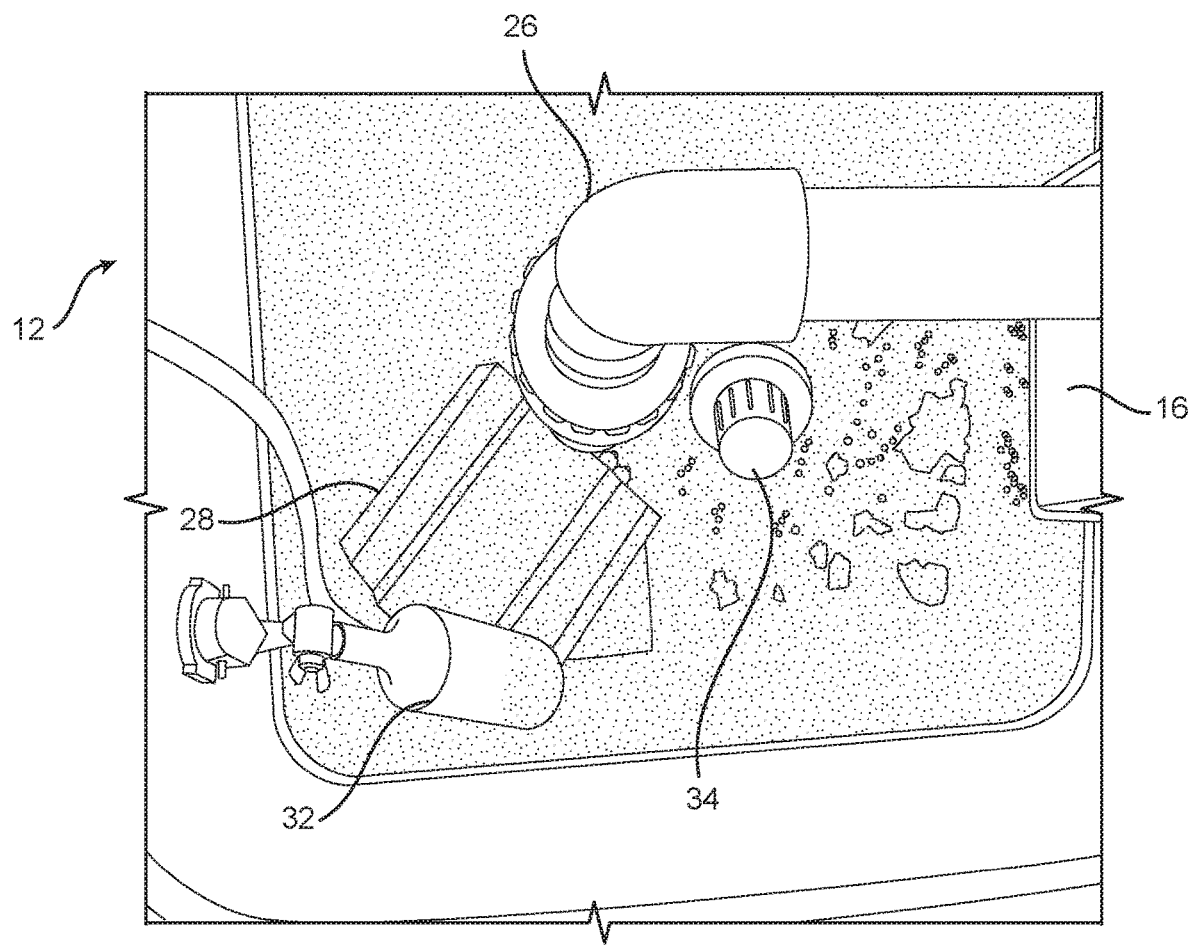
FIG. 6 is a top perspective view of the interior components of the waterfall recirculation return module.

FIG. 6 is an expanded view of the interior of the waterfall recirculation return module 12. The hydroponic growing system 10 utilizes a manifold and water injection system to create the constant aeration and circulation of the water within the system. To achieve this, the hydroponic growing system 10, utilizes a waterfall design and process. Further explained, this process begins in the waterfall recirculation return module 12. In the waterfall recirculation return module 12, water is pulled up from the bottom of the module through a micron mesh filter 34, used to remove impurities and eliminate system clogging, into the 1200 GPH water pump 28 which propels the water into the water injection manifold entry component 26 into the water injection manifold 22, as seen in FIGS. 1, 2, 3, 4, 8, 10, 12, distributing water into each of the growing units 18. The hydroponic growing system's 10 water level is maintained by the float mechanism 32. After the water circulates throughout the hydroponic growing system 10, the water returns back to the waterfall recirculation return module 12, via the water return channel 16, re-entering the waterfall recirculation return module 12 in a waterfall as shown.

Figure 7:
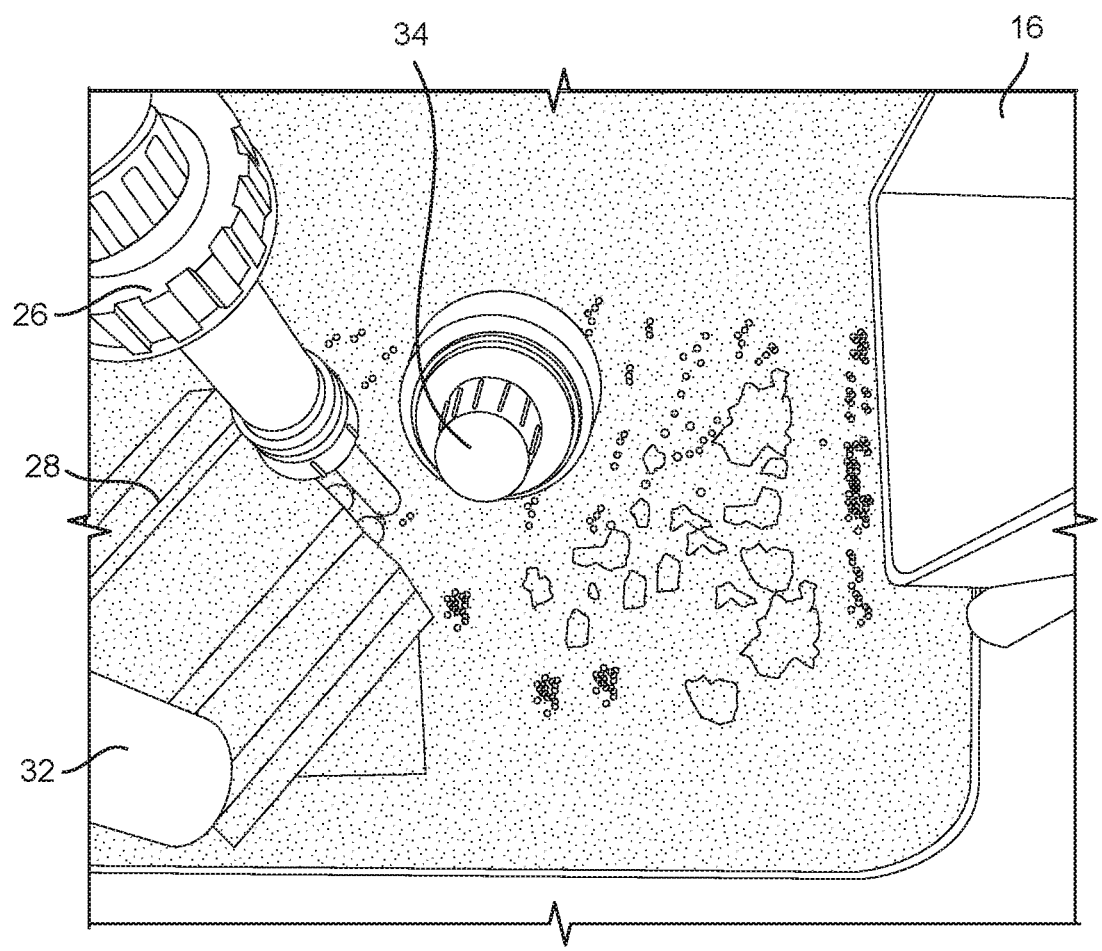
FIG. 7 is a top perspective view of the return water channel as it enters the waterfall recirculation return module.

FIG. 7 is a different and close-up view of the hydroponic growing system 10 discussed in the FIG. 6 description. This view contains the waterfall recirculation return module 12, water return channel 16, water injection manifold entry component 26, 1200 GPH water pump 28, float mechanism 32, and micron mesh filter 34. This view offers a clearer view of the water return channel 16 and the subsequent waterfall effect and momentum of the water that remains even after the water has circulated throughout the entire hydroponic growing system.

Figure 8:
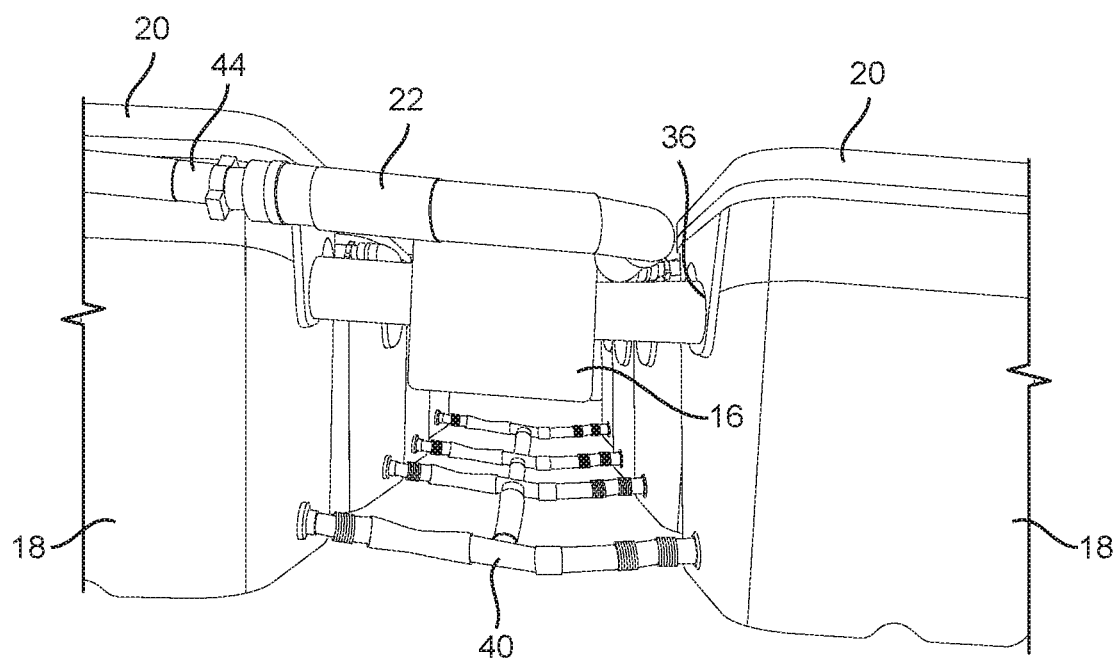
FIG. 8 is a side view of the present disclosure from underneath the hydroponic growing system at the end distant from the waterfall recirculation return module that shows the drainage system, water return channel, and water injection manifold.

FIG. 8 shows a bottom view of the hydroponic growing system 10. Shown is the water return channel 16, multiple growing units 18 with lids 20, the water injection manifold 22, water return channel unit connections 24, the 1¹ᐟ²" seal 36, the drainage system 40, and the growing unit exterior sprayer arm assembly 44. The water moves from the waterfall recirculation return module 12 shown in FIGS. 1, 2, 3, 4, 5, 6, 7, and 11 via the water injection manifold 22 which is attached to the growing units 18 by the growing unit exterior sprayer arm assembly 44. The water exits the growing unit 18 through a 1$^{1/2"}$ seal 36, back into the water return channel 16, that travels the length of the channel with continued momentum, returning to the waterfall recirculation return module 12 and falling into the waterfall recirculation return module 12 to be quickly pumped back through the hydroponic growing system 20. The drainage system 40 is for drainage purposes only and does not contribute in the water injection or waterfall process of the hydroponic growing system 10.

Figure 9:
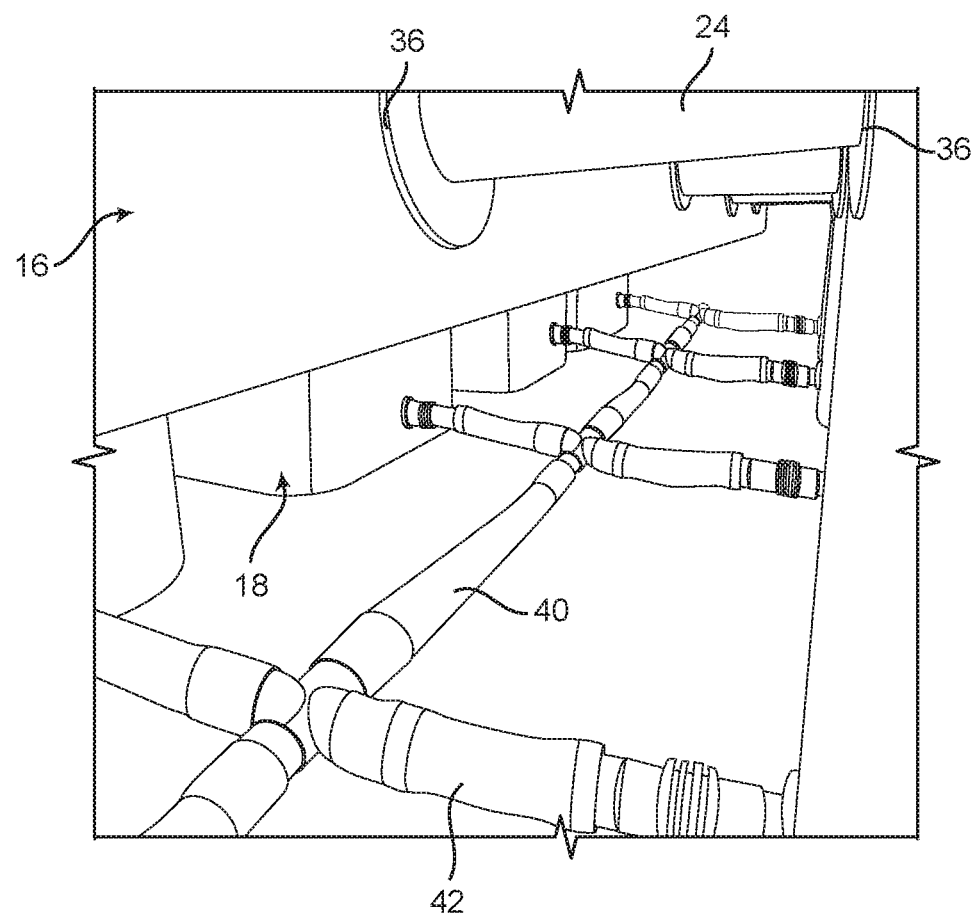
FIG. 9 is a magnified side view of the present disclosure from underneath the hydroponic growing system that shows the drainage system connections to the water return channel and growing units.

FIG. 9 represents a closer view of the connections of the drainage system 40, water return channel 16, water return channel unit connection 24 and the 1$^{1/2"}$ seals 36 that maintain a water tight connection. The drainage system 40, comprised of hosing, is installed under hydroponic growing system 10, is connected to the bottom of every growing unit 18, by a ¾" hose connections and ¾" cross, and/or T connectors 42.

Figure 10:
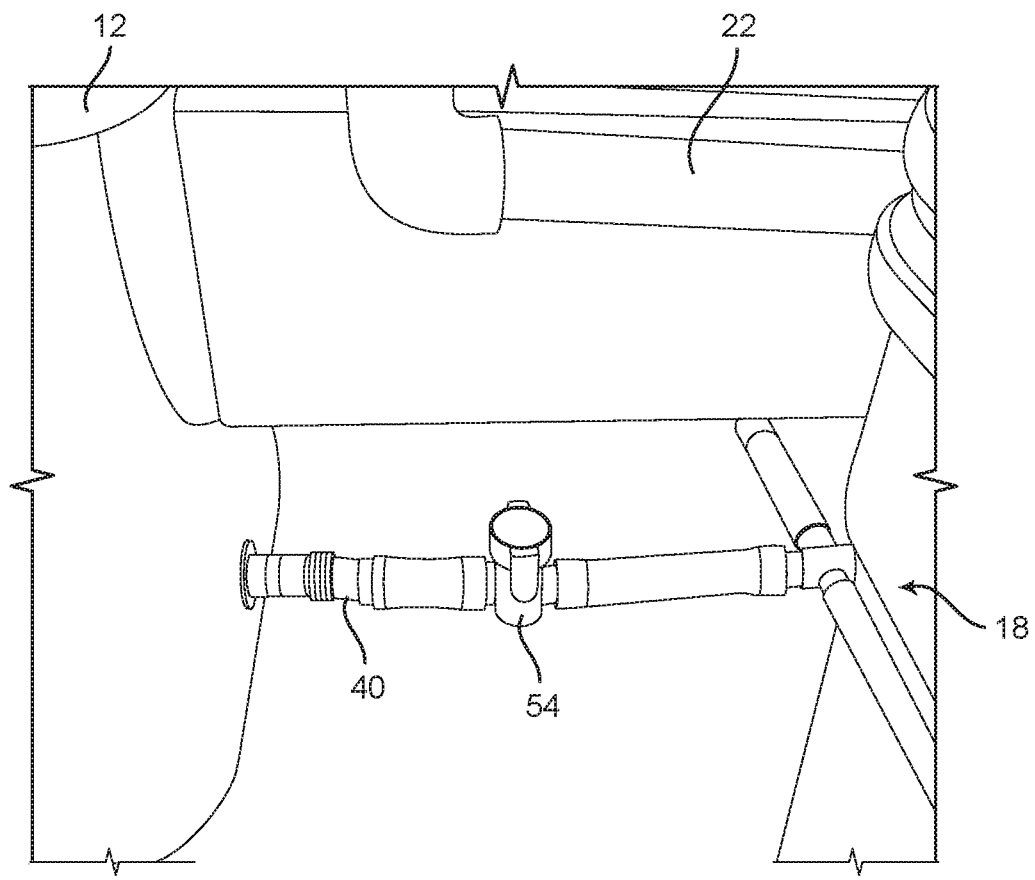
FIG. 10 is a top perspective view of the drainage system's shutoff valve located next to the waterfall recirculation return module.

FIG. 10 represents a view of the drainage system where it enters waterfall recirculation return module 12 at the opposite end of hydroponic growing system 10 that was shown in FIG. 9. The view shows a close-up perspective of the entry of water return channel 16 into the waterfall recirculation return module 12. Water injection manifold 22 is shown in perspective to the growing unit 18 and water return channel 16. This view shows the drainage system 40 enter into waterfall recirculation return module 12 through a ¾" hose connection. Prior to the entry into waterfall recirculation return module 12 is drainage system shutoff valve 54 that is engaged in a closed position while hydroponic growing system 10 is in use that maintains the water within hydroponic growing system 10. The drainage system shutoff valve 54 can be opened when hydroponic growing system 10 needs to be cleaned or drained. The hydroponic growing system 10 is self-draining allowing for easier cleaning between harvests. Hydroponic growing system 10 allows for a total system drain during any period of plant growth should issues within hydroponic growing system 10 occur. A total system drain and refill does not harm the plants, impact the growing cycle, or reduce the yield.

Figure 11:
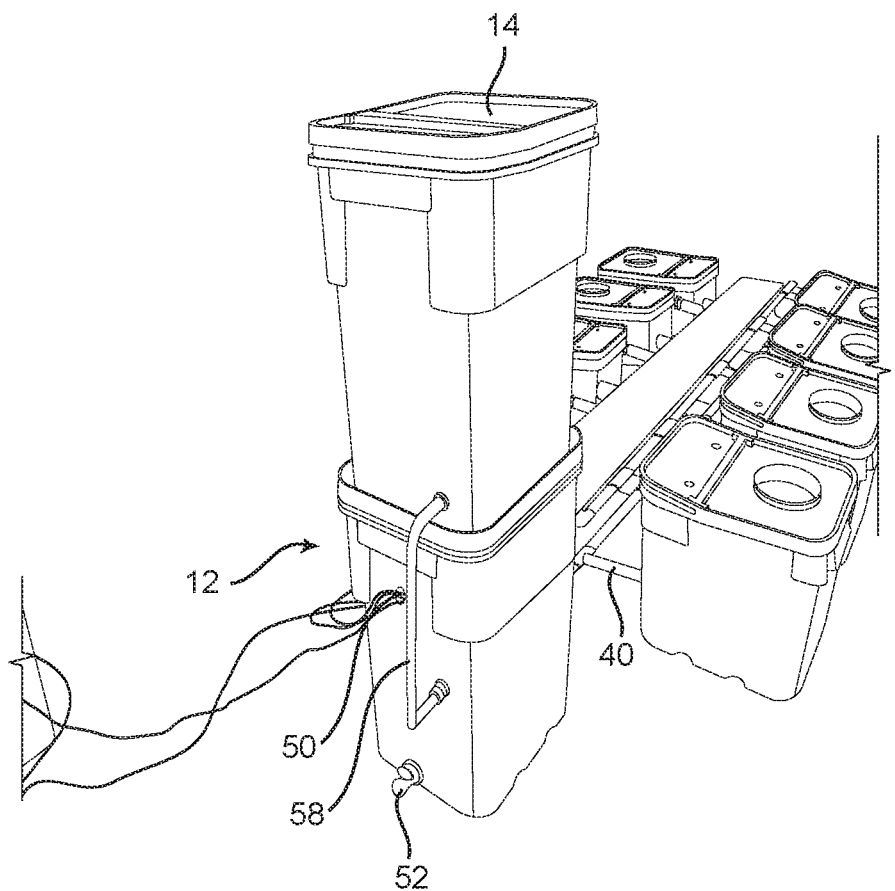
FIG. 11 is a rear perspective view of the present disclosure.
Figure 16:
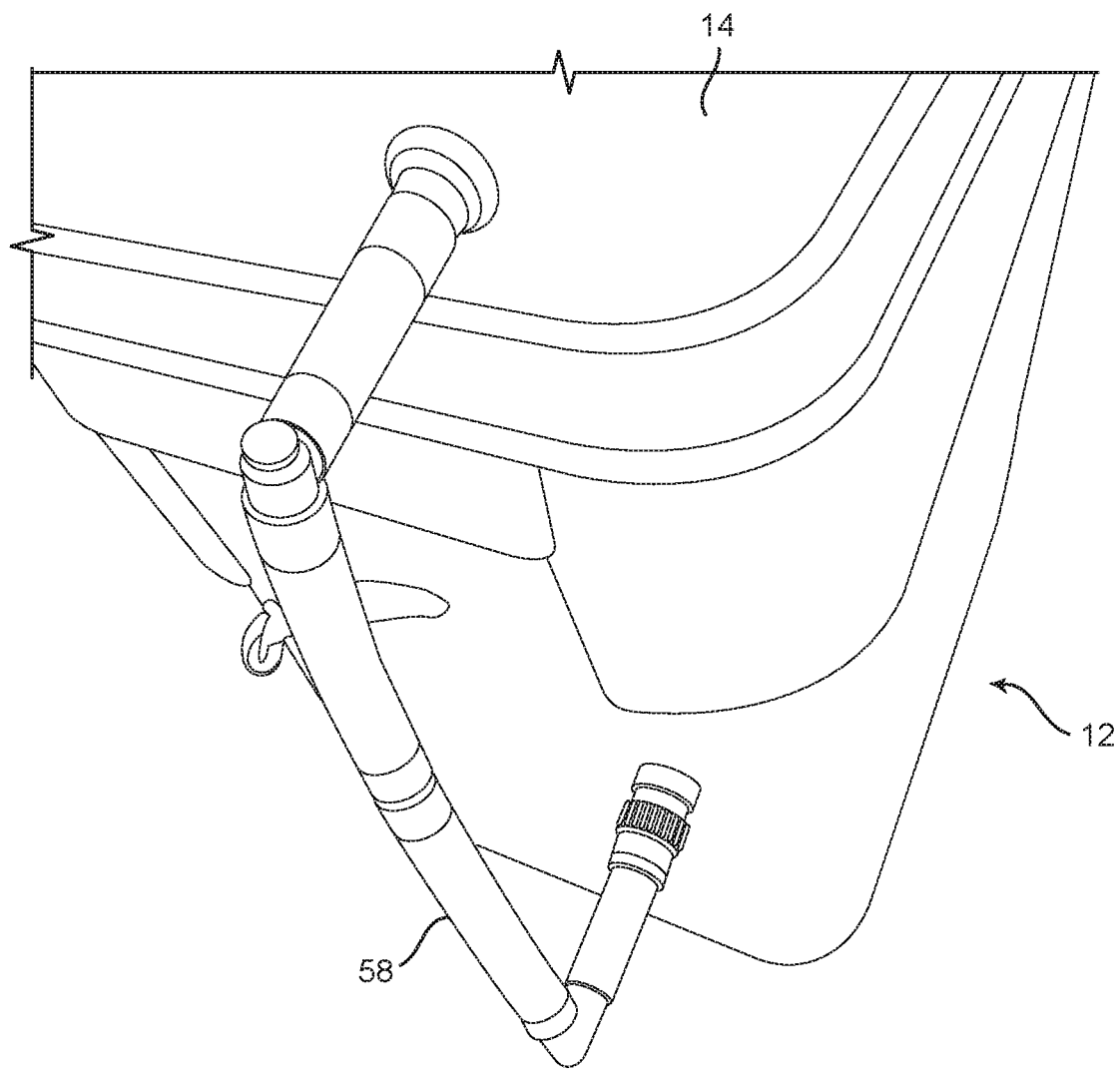
FIG. 16 is a rear perspective view of the waterfall recirculation return module of the present disclosure.

FIG. 11 shows waterfall recirculation return module 12 and waterfall recirculation return module refill reservoir 14. Shown is the electrical cord from 1200 GPH water pump 28, located inside waterfall recirculation return module 12, as it exits out of the waterfall recirculation return module 12 through 1200 GPH water pump cord exit 50 located at the top of the waterfall recirculation return module 12. Drainage system outlet 52, located at the bottom of waterfall recirculation return module 12, represents the release point of water for the entire system when hydroponic growing system 10 has to be emptied. Waterfall recirculation return module 12 and recirculation return module refill reservoir 14 are connected by return module connection hose 58 (shown in FIG. 16), that in conjunction with float mechanism 32 located inside waterfall recirculation return module 12, keep water levels even and systematically balanced.

Figure 12:
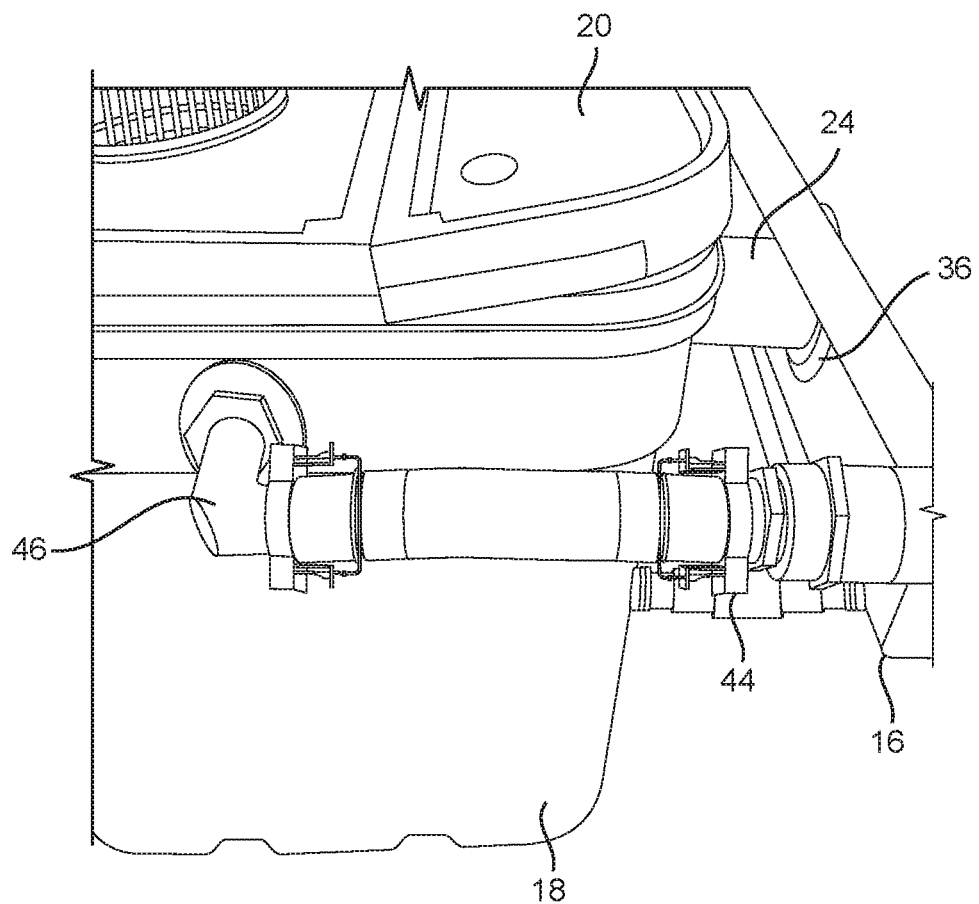
FIG. 12 is a side view of a growing unit the present disclosure.

FIG. 12 shows how water enters and exits growing units 18. Shown is water return channel 16, a growing unit 18 with lid 20, and water return channel unit connection 24 from growing unit 18 to water return channel 16, water injection manifold 22, growing unit exterior sprayer head arm assembly 44 and sprayer head connection 46 prior to its entry into a growing unit 18.

Figure 13:
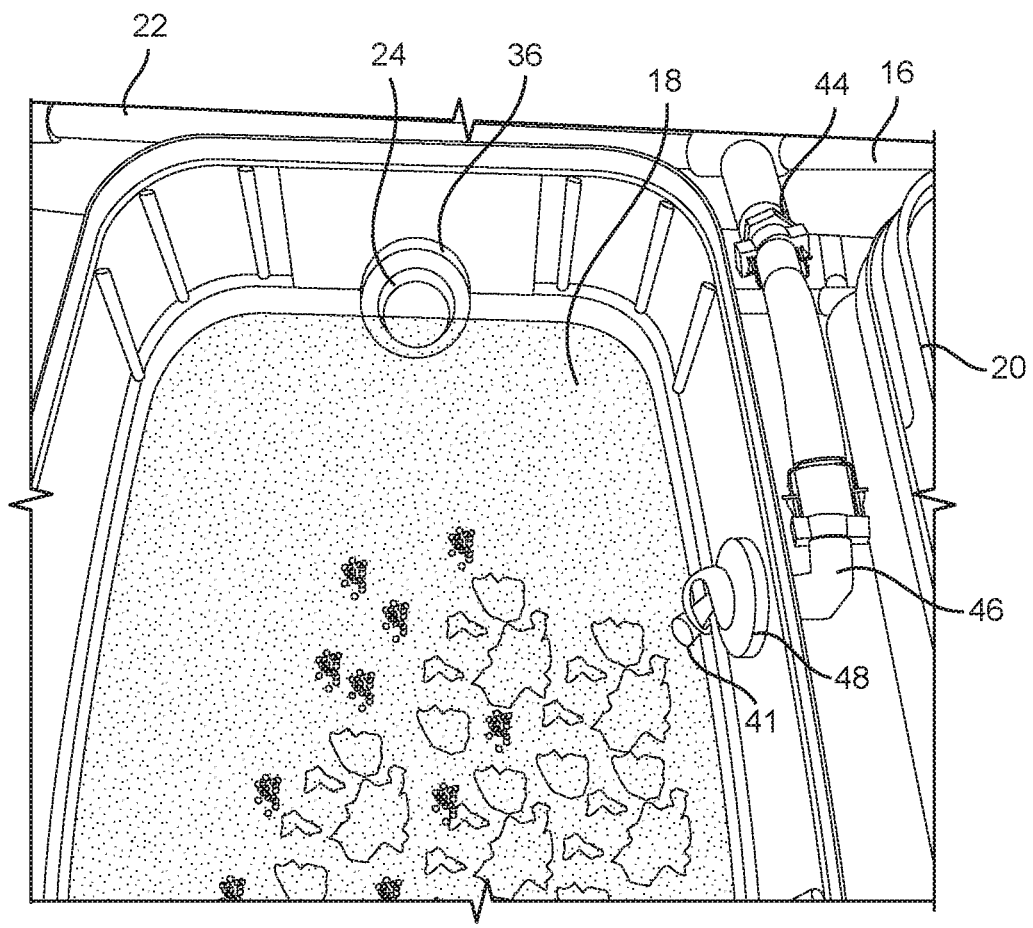
FIG. 13 is a top view of the interior of a growing unit of present disclosure.

FIG. 13 shows an interior view of growing unit 18 without lid 20. The water return channel 16, growing unit 18, water injection manifold 22, water return channel unit connection 24, 1$^{1/2"}$ seal 36, growing unit exterior sprayer head arm assembly 44, sprayer head connection 46, and sprayer 48 are shown. Hydroponic growing system 10 utilizes a manifold and water injection system that through use of water injection manifold 22, growing unit exterior sprayer head arm assembly 44, sprayer head connection 46, and sprayer 48, that work in combination, to inject water into the pool of water in growing units 18. Sprayer 48, located at the top of growing unit 18, break the water's surface tension within growing unit 18, creating high levels of water oxygenation, as the air and water are introduced to the root mass of the plant. The water, in a constant state of motion, circulates in growing unit 18 before it exits into the water return channel 16 that travels the entire length of the hydroponic growing system 10, returning back to waterfall recirculation return module 12, where the process starts again. This present disclosure's unique design sustains dissolved oxygen levels without use of air stones and can maintain a living organism successfully. Of 100% of the surface area in growing unit 18 approximately 40% of the water surface area is impacted directly by the sprayer. This percent is sufficient oxygenation to sustain plant life successfully in one embodiment of the present disclosure. The percent of the growing unit water surface directly impacted by the spray may vary, depending on the size and shape of the growing unit, and the amount of water contained within, to optimize oxygenation, as would be known to one of ordinary skill in the art.

Figure 14:
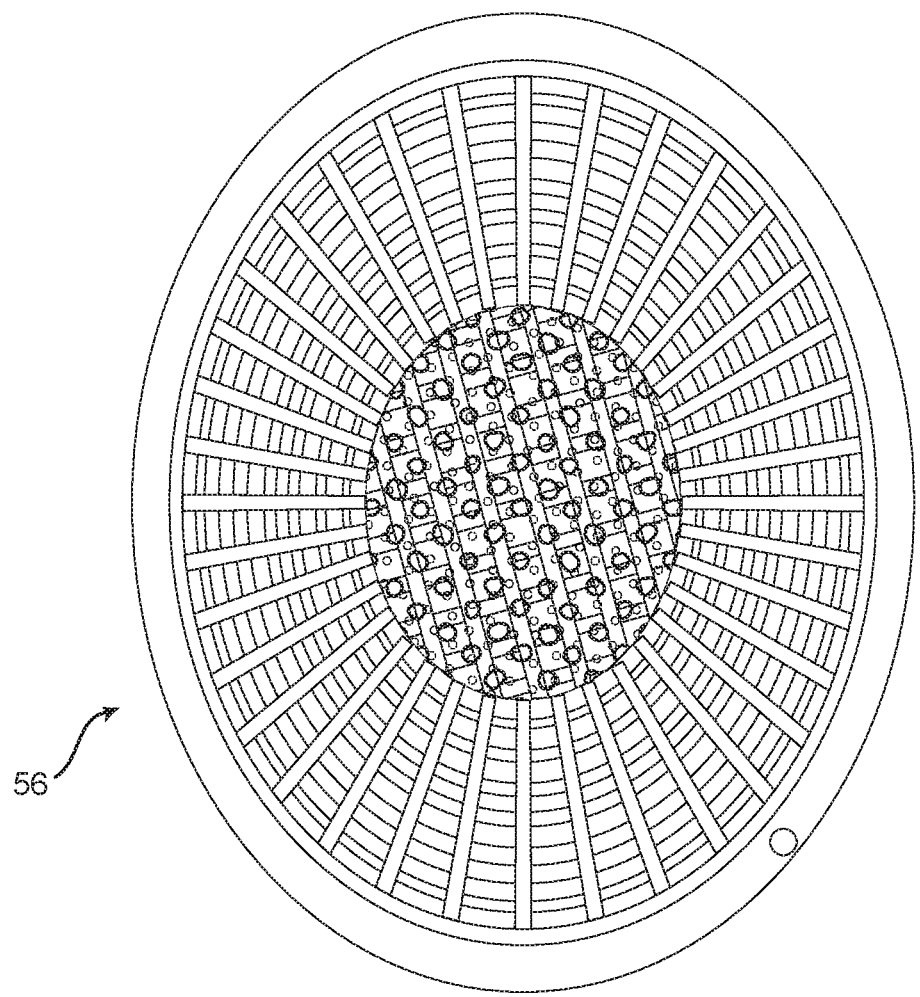
FIG. 14 is a top view of a net pot of the present disclosure.
Figure 17:
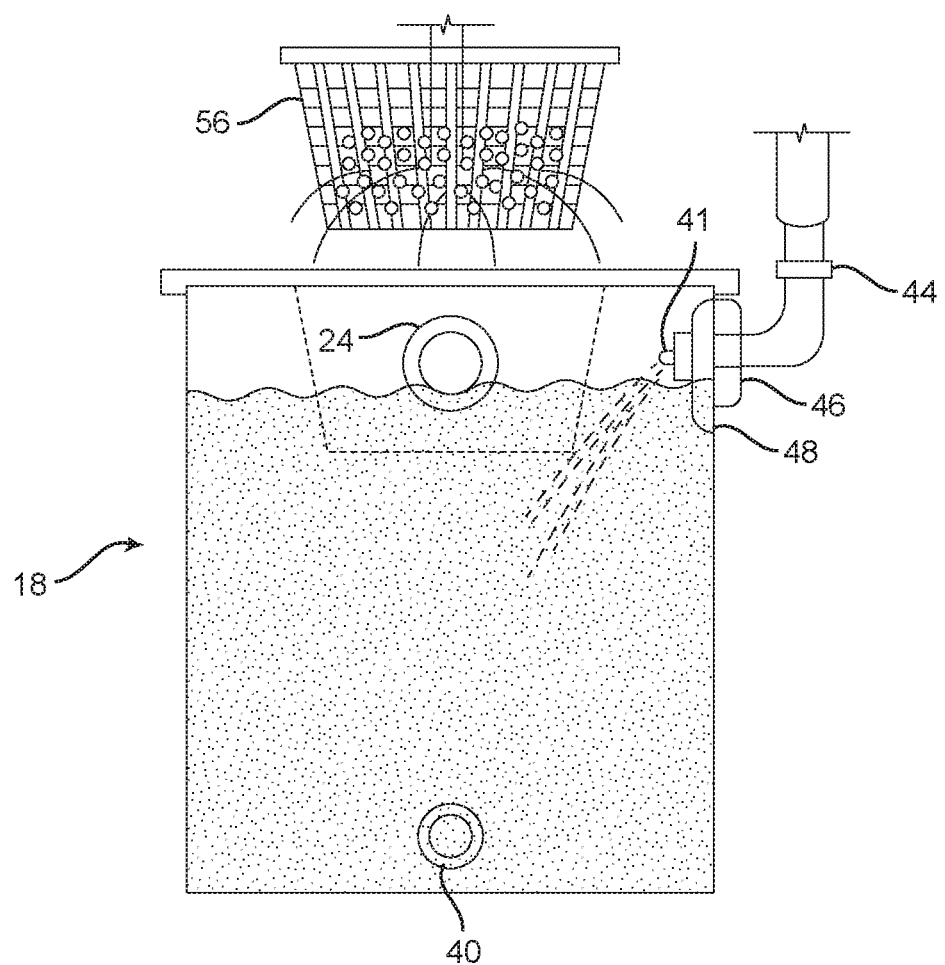
FIG. 17 is a cross-sectional side view of a growing unit of the present disclosure.

FIG. 14 shows a lid 20 of growing unit 18 with net pot 56 inserted in lid 20. The plant is grown in net pot 56. Net pot 56 is placed into growing unit 18 where it is partially submerged in water, as shown in FIG. 17. The lids 20 can be modified to hold more than one net pot 56 per growing unit 18. Additionally, hydroponic growing system 10 design allows for growing units 18 to be added or subtracted from the system with ease based on growing capacity need allowing for greater control of resources and production yields.

Figure 15A:
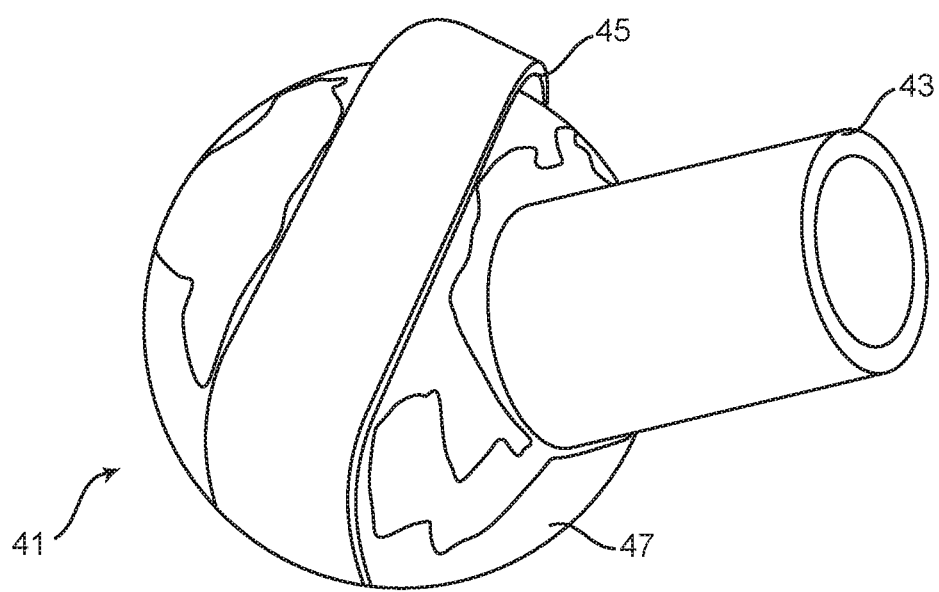
FIGS. 15A and 15B are a perspective view of sprayer components of the present disclosure.
Figure 15B:
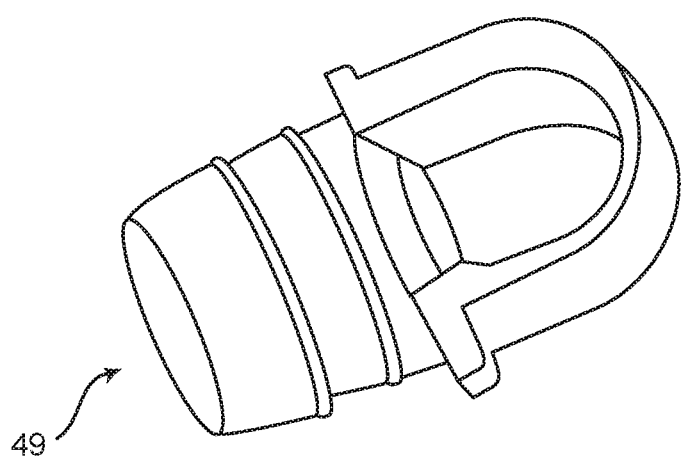

FIGS. 15A and 15B show modified and unmodified spray heads. FIG. 15b shows an unmodified sprayer head 49, which may be alternatively referred to as a plug, which sprays water in an arc pattern. The modification to the tip of the sprayer 48 to produce modified spray head 41 allows for control over the water released from the sprayer. Unmodified sprayer head 49 was, in one embodiment, modified by drilling a hole through its center and inserting a piece of plastic tubing, whereupon the pieces were adhered together with water tight glue. The glue formed a circular dome. FIG. 15A shows a round handle 45 of the plug pictured in FIG. 15B. A glue ball 47 made in the adaptation of the insertion of the plastic tube into the plug. Round handle 45 is used to pull the modified sprayer head 41 out of sprayer 48, which is attached to sprayer head connection 46, which is attached to exterior sprayer head arm assembly 44, which is, in turn, attached to the growing unit 18. Round handle 45 inserts inside the sprayer 48 and sprayer head connection 46 and the exterior sprayer head arm assembly 44 which can be taken apart and the "sprayer system" can be pulled out of the growing unit 18 to be cleaned, maintenance, and moved. The modification restricts water, re-aims the direction of the water released from the sprayer 48, which redirects and pinpoints the water allowing for the breaking of the growing unit 18 water's surface tension to occur at the plant's root mass increasing the amount of dissolved oxygen which creates an exceptional growing environment. Plastic tube 43 is shown in FIG. 15A.

Figure 18:
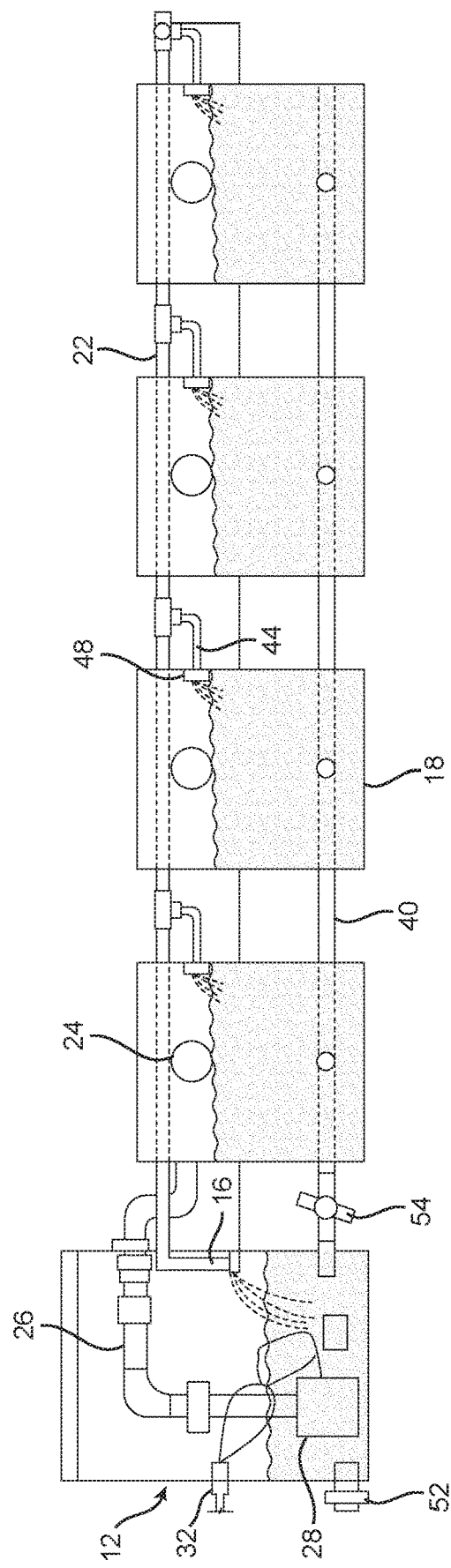
FIG. 18 is a cross-sectional side view of the system of the present disclosure.
Figure 20:
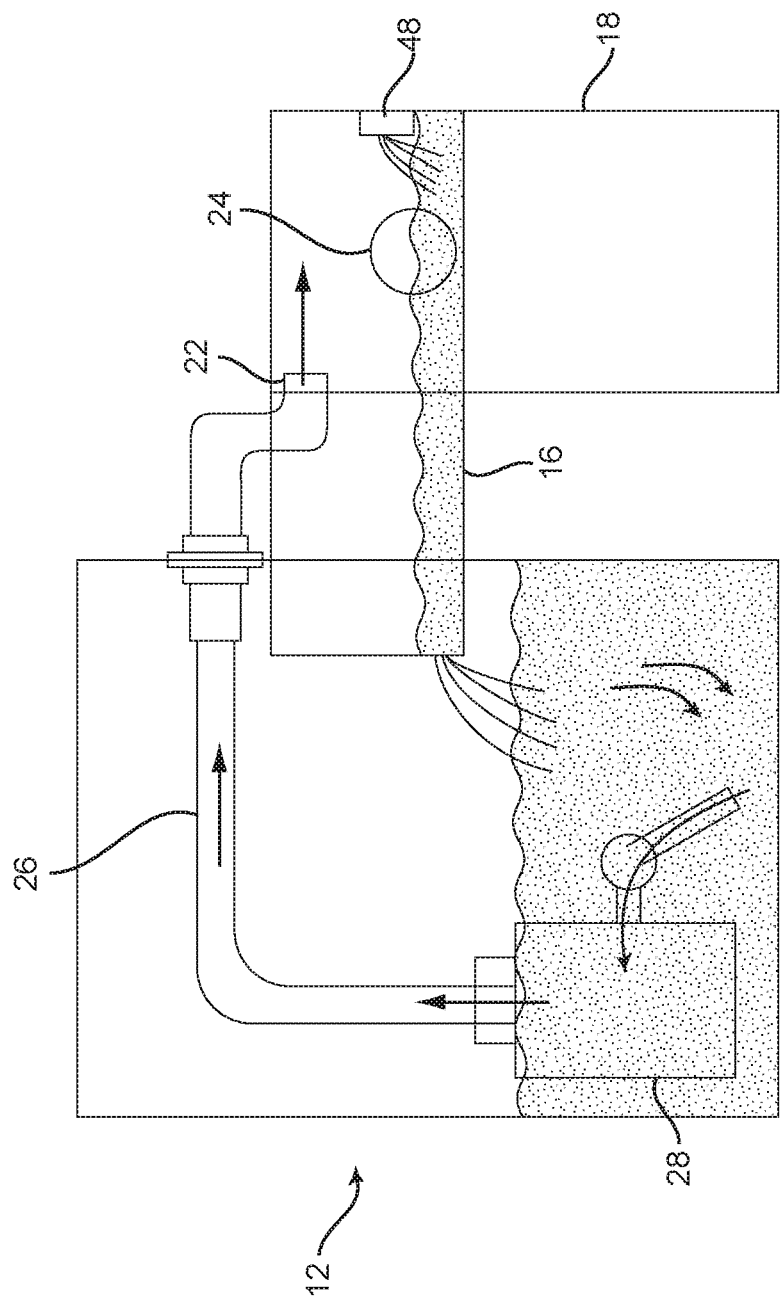
FIG. 20 is a cross sectional side view of a water return channel and recirculation return module of the present disclosure.

FIG. 18 shows a cross sectional view of the system of the present disclosure, where water flows from water pump 28 in waterfall recirculation return module 12 through water injection manifold entry component 26 into water injection manifold 22 (also shown in FIG. 20). From water injection manifold 22, water flows through exterior sprayer head arm assembly 44 to sprayer head connection 46 into sprayer 48. Sprayer 48 sprays water into growing unit 18 to oxygenate the water in the growing unit. Water may be drained from system 10 by drainage system 40.

While various embodiments of this disclosure have been described above and shown in the accompanying drawings, it should be understood that applicant does not intend to be limited to the particular details described above and illustrated in the accompanying drawings, but intends to be limited only to the scope of the disclosure as defined by the following claims. In this regard, the term "configured" as used in the claims is intended to include not only the designs illustrated in the drawings of this application and the equivalent designs discussed in the text, but it is also intended to cover other equivalents now known to those skilled in the art, or those equivalents which may become known to those skilled in the art in the future.

I claim:

1. A hydroponic growing system, comprising:
   a plurality of growing units, wherein each growing unit includes a container for a plant;
   wherein each growing unit is linked through a water recirculation system; wherein the water recirculation system includes a waterfall recirculation return module, a water injection manifold, a plurality of growing units, a plurality of sprayers and a water return channel;
   wherein the waterfall recirculation return module includes a water pump in fluid communication with the water injection manifold;
   wherein the water injection manifold is in fluid communication with the plurality of sprayers to simultaneously provide an equal amount of water to the plurality of sprayers;
   wherein each sprayer is located on an inner portion of the growing unit above a growing unit water pool level;
   wherein each sprayer is adapted to direct a spray of water onto a growing unit water surface;
   wherein each growing unit is in fluid communication with the water return channel;
   wherein the water return channel is adapted to direct water from the plurality of growing units into a waterfall recirculation return module;
   wherein the water pump maintains a flow of water such that an amount of water leaving each sprayer is constant and the growing unit water pool level is constant.

2. The hydroponic growing system of claim 1, wherein a vertical gap exists between a terminus of the water return channel and a surface of water in the waterfall recirculation return module.

3. The hydroponic growing system of claim 1, wherein a lid includes at least one opening adapted to hold at least one plant.

4. The hydroponic growing system of claim 1, further comprising a float mechanism.

5. The hydroponic growing system of claim 1, wherein each growing unit includes a drainage aperture at the bottom of the growing unit; wherein the drainage aperture is connected to a drainage connection system; wherein the drainage connection system has a drainage shutoff valve; wherein the drainage connection system connects to the waterfall recirculation return module.

6. The hydroponic growing system of claim 1, wherein the hydroponic growing system is self-draining allowing for easier cleaning between harvests.

7. The hydroponic growing system of claim 1, wherein a sprayer head provides sufficient oxygen directly to a root system thereby creating sufficient oxygen availability.

8. The hydroponic growing system of claim 1, wherein at least one net pot, a water return channel unit connection, and at least one sprayer are located at the top of each growing unit.

9. The hydroponic growing system of claim 1, wherein at least one net pot is inserted in a lid.

10. The hydroponic growing system of claim 1, wherein a filter is adapted to filter water drawn from the bottom of the waterfall recirculation return module.

11. The hydroponic growing system of claim 1, wherein a parts per million of oxygen in a growing unit water pool is measured with a standard oxygen measuring device at a level between 8 and 8.5.

12. The hydroponic growing system of claim 1, wherein approximately 40% of the growing unit water surface is directly contacted by a spray from the sprayer.

13. A hydroponic growing system, comprising:
    a plurality of growing units, wherein each growing unit includes a container for a plant;
    wherein each growing unit is linked through a water recirculation system;
    wherein the water recirculation system includes a sprayer located on an inner portion of each growing unit above a growing unit water pool level;
    wherein the water recirculation system is adapted to simultaneously provide an equal amount of water to a plurality of sprayers and each sprayer is adapted to direct a spray of water into a growing unit water surface;
    wherein a water pump recirculates water within the water recirculation system.

14. The hydroponic growing system of claim 13, wherein approximately 40% of the growing unit water surface is directly contacted by the spray of water from the sprayer.

15. The hydroponic growing system of claim 13, wherein a parts per million of oxygen in a growing unit water pool is measured with a standard oxygen measuring device at a level between 8 and 8.5.

16. The hydroponic growing system of claim 13, wherein the water pump is contained within a waterfall recirculation module.

17. The hydroponic growing system of claim 13, wherein a micron mesh filter filters water entering the water pump; wherein the water pump propels the water into a water injection manifold entry component and a water injection manifold thereby distributing water to each growing unit.

18. The hydroponic growing system of claim 1, wherein the hydroponic growing system is self-draining allowing for easier cleaning.

* * * * *